(12) United States Patent
Tyagi et al.

(10) Patent No.: US 11,481,474 B2
(45) Date of Patent: Oct. 25, 2022

(54) DISCOVERY AND ALLOCATION OF ENTITLEMENTS TO VIRTUALIZED APPLICATIONS

(71) Applicant: ServiceNow, Inc., Santa Clara, CA (US)

(72) Inventors: Rohan Tyagi, San Jose, CA (US); Prateek Bansal, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 189 days.

(21) Appl. No.: 16/669,005

(22) Filed: Oct. 30, 2019

(65) Prior Publication Data
US 2020/0349239 A1 Nov. 5, 2020

(30) Foreign Application Priority Data
May 3, 2019 (IN) .............................. 201911017818

(51) Int. Cl.
*G06F 21/10* (2013.01)
(52) U.S. Cl.
CPC .... *G06F 21/105* (2013.01); *G06F 2221/0737* (2013.01)
(58) Field of Classification Search
CPC ........................ G06F 21/105; G06F 2221/0737
See application file for complete search history.

(56) References Cited

U.S. PATENT DOCUMENTS

| | | | |
|---|---|---|---|
| 5,978,594 A | 11/1999 | Bonnell | |
| 6,321,229 B1 | 11/2001 | Goldman | |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |

(Continued)

OTHER PUBLICATIONS

Servicenow, "Madrid Software Asset Management" last updated Apr. 15, 2019.

*Primary Examiner* — David J Pearson
(74) *Attorney, Agent, or Firm* — Fletcher Yoder PC

(57) ABSTRACT

An example embodiment may involve identifying a virtual software application that is accessible within a managed network. The example embodiment may further involve determining a delivery group associated with accessing the virtual software application within the managed network. The example embodiment may further involve, based on the delivery group, determining a potential-entity count of entities with access to the virtual software application within the managed network. The example embodiment may further involve calculating compliance of a software license associated with the virtual software application based on the potential-entity count.

20 Claims, 12 Drawing Sheets

(56) References Cited

U.S. PATENT DOCUMENTS

| | | | |
|---|---|---|---|
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidar |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota et al. |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,683,032 B2 | 3/2014 | Spinelli |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Non |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,557,969 B2 | 1/2017 | Sharma |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,867,162 B2 | 5/2018 | Spinelli |
| 9,967,162 B2 | 5/2018 | Spinelli |
| 10,002,203 B2 | 6/2018 | George |
| 11,068,136 B1* | 7/2021 | Koushik ................ H04L 67/36 |
| 2009/0228984 A1* | 9/2009 | Sterin ................ G06Q 10/0637 |
| | | | 726/26 |
| 2011/0131315 A1* | 6/2011 | Ferris .................... G06F 21/105 |
| | | | 709/224 |
| 2016/0092887 A1* | 3/2016 | Jagad .................... G06F 21/105 |
| | | | 705/59 |
| 2018/0225729 A1* | 8/2018 | Li .......................... G06Q 30/06 |
| 2019/0087204 A1* | 3/2019 | Babol ................ G06F 9/45533 |

* cited by examiner

SOFTWARE COMPLIANCE REPORTING USER INTERFACE 900

VIRTUAL SOFTWARE LICENSING COSTS BY PUBLISHER 1000

| PUBLISHER 1 1010  COMPLIANT<br>$0.00 TRUE-UP COST<br>$1024.35 EXCESS LICENSE COST<br>$900.00 POTENTIAL SAVINGS | PUBLISHER 2 1020  NON-COMPLIANT<br>$3,823.00 TRUE-UP COST<br>$123,024.35 EXCESS LICENSE COST<br>$10,123.45 POTENTIAL SAVINGS |
|---|---|
| PUBLISHER 3 1030  COMPLIANT<br>$0.00 TRUE-UP COST<br>$4321.28 EXCESS LICENSE COST<br>$0.00 POTENTIAL SAVINGS | PUBLISHER 4 1040  NON-COMPLIANT<br>$9,345.55 TRUE-UP COST<br>$89,126.98 EXCESS LICENSE COST<br>$26,725.49 POTENTIAL SAVINGS |
| PUBLISHER 5 1050  NON-COMPLIANT<br>$5,000.00 TRUE-UP COST<br>$0.00 EXCESS LICENSE COST<br>$0.00 POTENTIAL SAVINGS | PUBLISHER 6 1060  NON-COMPLIANT<br>$88,000.00 TRUE-UP COST<br>$1,234,555.66 EXCESS LICENSE COST<br>$749,000.00 POTENTIAL SAVINGS |

┌──────────────────────────────────────────────────────────────────┐
│ 1110 DETERMINE A VIRTUAL SOFTWARE APPLICATION THAT IS ACCESSIBLE │
│                    WITHIN A MANAGED NETWORK                      │
└──────────────────────────────────────────────────────────────────┘
                                  │
                                  ▼
┌──────────────────────────────────────────────────────────────────┐
│ 1112 DETERMINE A DELIVERY GROUP ASSOCIATED WITH ACCESSING THE    │
│   VIRTUAL SOFTWARE APPLICATION WITHIN THE MANAGED NETWORK        │
└──────────────────────────────────────────────────────────────────┘
                                  │
                                  ▼
┌──────────────────────────────────────────────────────────────────┐
│ 1114 BASED ON THE DELIVERY GROUP, DETERMINE A POTENTIAL-ENTITY   │
│  COUNT OF ENTITIES WITH ACCESS TO THE VIRTUAL SOFTWARE APPLICATION│
│                    WITHIN THE MANAGED NETWORK                    │
└──────────────────────────────────────────────────────────────────┘
                                  │
                                  ▼
┌──────────────────────────────────────────────────────────────────┐
│ 1116 CALCULATE COMPLIANCE OF A SOFTWARE LICENSE ASSOCIATED WITH  │
│  THE VIRTUAL SOFTWARE APPLICATION BASED ON THE POTENTIAL-ENTITY  │
│                              COUNT                               │
└──────────────────────────────────────────────────────────────────┘
```

FIG. 11

DISCOVERY AND ALLOCATION OF ENTITLEMENTS TO VIRTUALIZED APPLICATIONS

CROSS-REFERENCE TO RELATED APPLICATION

This application claims priority to Indian provisional patent application no. 201911017818, filed May 3, 2019, which is hereby incorporated by reference in its entirety.

BACKGROUND

An enterprise may use a number of computing devices to efficiently facilitate and manage its interrelated operations. Each such computing device may have one or more software packages installed thereon. Where the software is proprietary, the enterprise may procure software licenses for at least some of the computing devices to allow the enterprise to use the software. The enterprise may maintain records of these software licenses so that the enterprise can properly track usage of multiple licenses based on the installations of the software packages.

SUMMARY

For medium and large enterprises, managing licenses for software applications involves more than just tracking installed software applications. Rather, managing these licenses may involve tracking access to the software applications.

The embodiments herein involve, but are not limited to, determining access to shared software applications or "virtual software applications" that can be shared throughout a managed network of devices. A virtual software application can be part of a virtual desktop that enables access to multiple software applications. In some examples, software licenses for software applications, including virtual software applications, are based on a number of "entities" (e.g., users, devices) that have access to the software application regardless of actual usage. However, traditional metrics for software license compliance involving tracking usage data for software applications. Such metrics may not be accurate for licenses that are based on a number of entities having access to these software applications.

Access to virtual software applications can be based on groups of entities (users and/or devices) maintained in an active directory or similar data structure. The active directory can specify a number of delivery groups of software applications, virtual software applications, and/or virtual desktops. A delivery group can be used to provide access to a list of accessible applications and/or desktops by a corresponding list of entities. That is, an entity in the list of entities of a delivery group can obtain access to the applications and/or desktops of the list of accessible applications and/or desktops via the delivery group. To determine a number of entities that have access to a virtual software application (or virtual desktop), one or more active directories can be used to find one or more delivery groups. Then, a delivery group of the one or more delivery groups can be determined to be associated with accessing the virtual software application; that is, the delivery group can have the virtual software association listed in its list of accessible applications and/or desktops. Then, based on the delivery group, a potential-entity count of entities with access to the virtual application within the managed network can be determined; for example, by counting the entities in the list of entities of the delivery group.

Compliance of a software license associated with the virtual software application can be calculated based on the potential-entity count. For example, a number of allowed users that are permitted to use the virtual software application under the software license can be determined. If the potential-entity count is greater than the number of allowed users, then the managed network can be considered to be not compliant with the software license. However, if the potential-entity count is not greater than the number of allowed users, then the managed network can be considered to be compliant with the software license.

Accordingly, a first example embodiment may involve identifying a virtual software application that is accessible within a managed network. The first example embodiment may further involve determining a delivery group associated with accessing the virtual software application within the managed network. The first example embodiment may further involve, based on the delivery group, determining a potential-entity count of entities with access to the virtual software application within the managed network. The first example embodiment may further involve calculating compliance of a software license associated with the virtual software application based on the potential-entity count.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 10 depicts a user interface for software license compliance reporting, in accordance with example embodiments.

FIG. 11 is a flow chart, in accordance with example embodiments.

DETAILED DESCRIPTION

Figure 1:
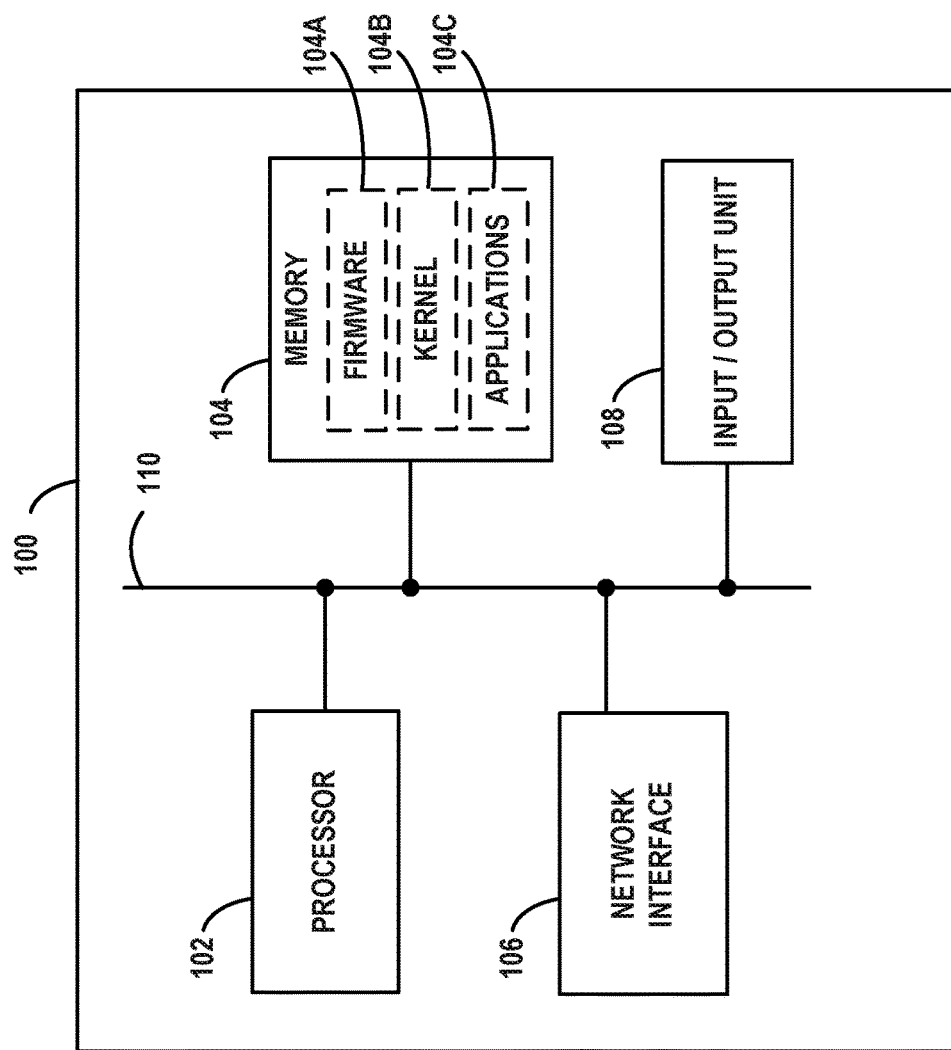
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
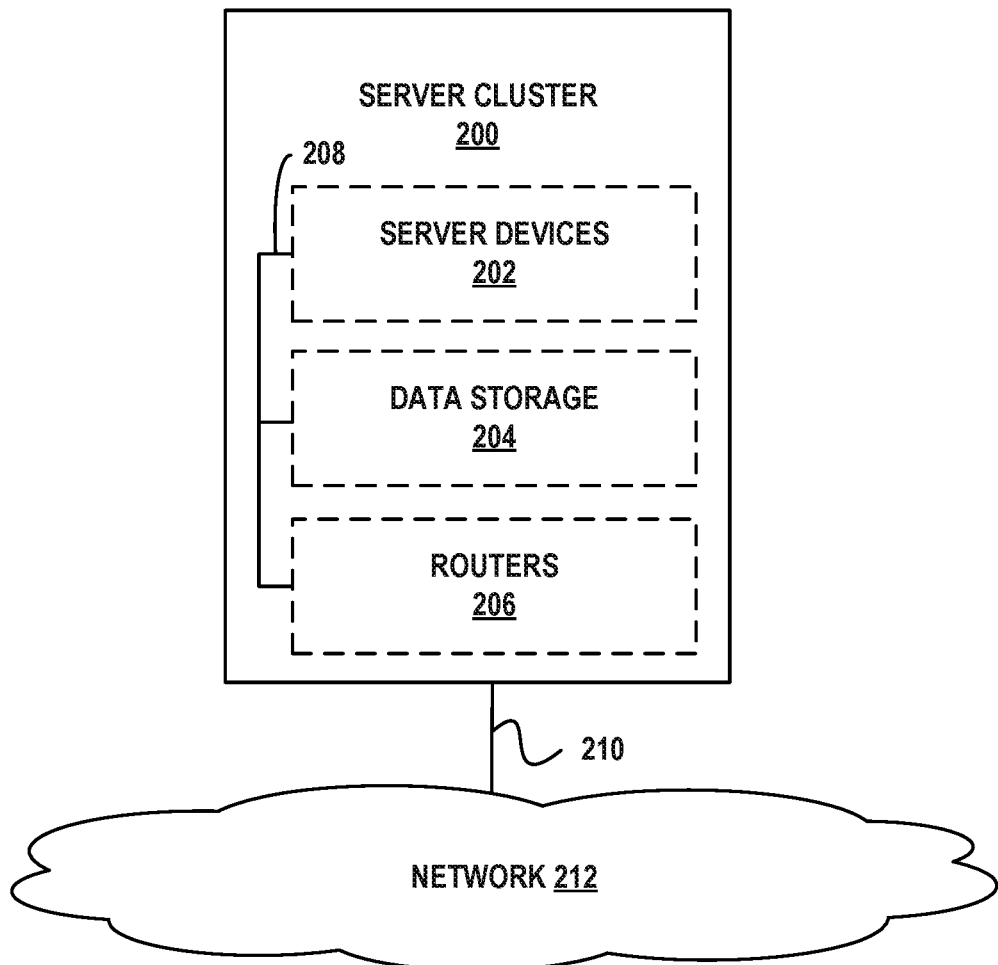
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
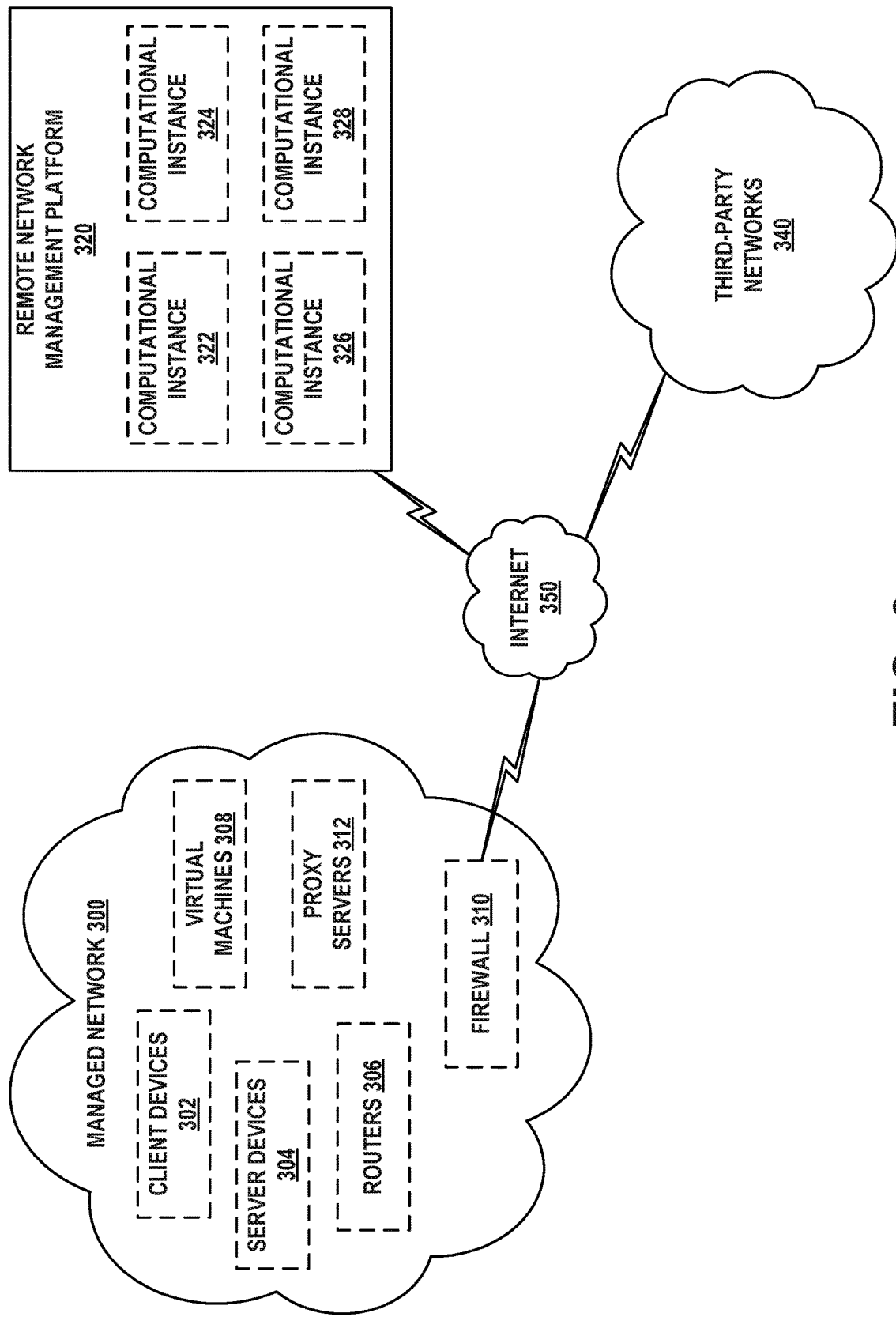
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
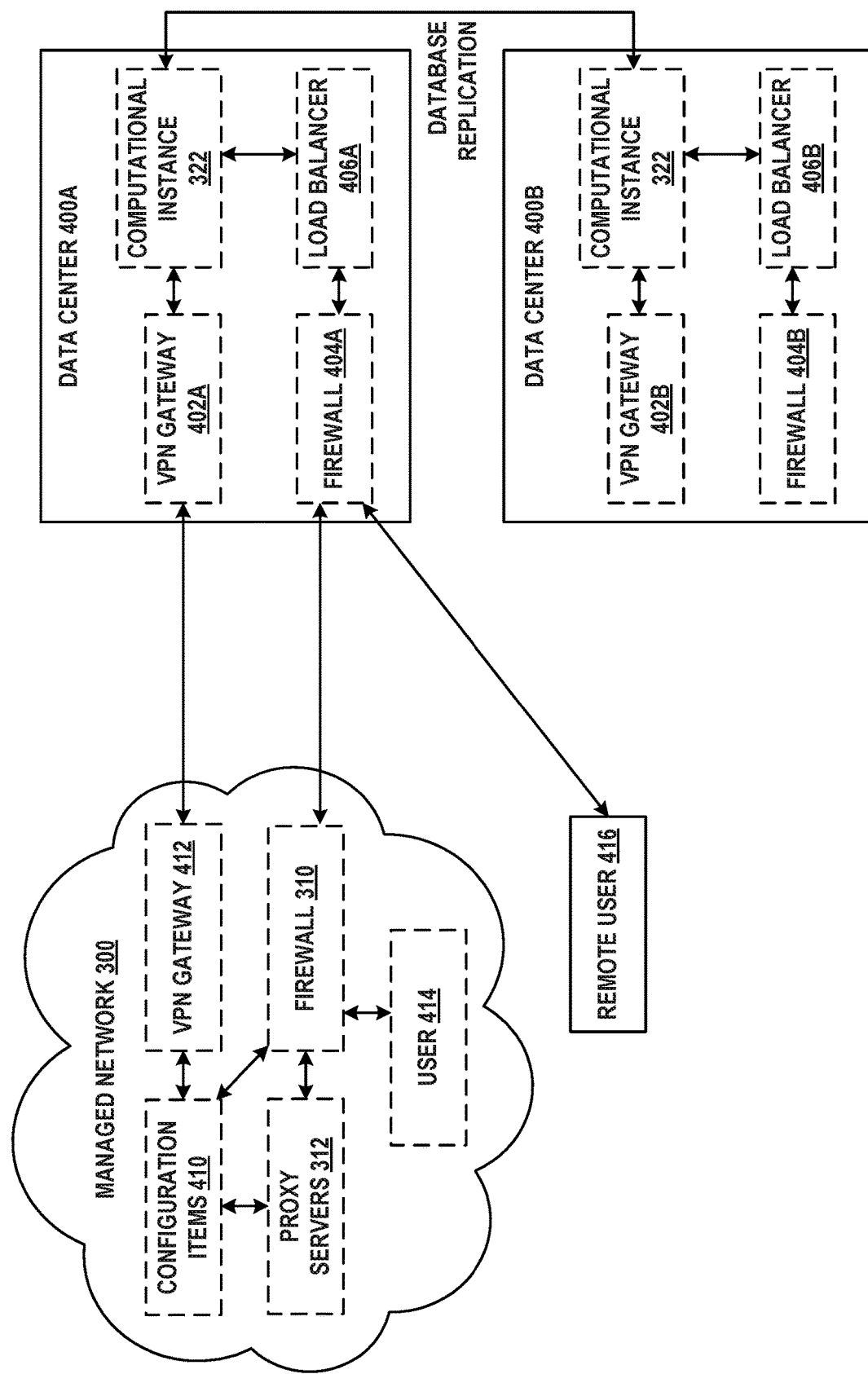
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-

10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
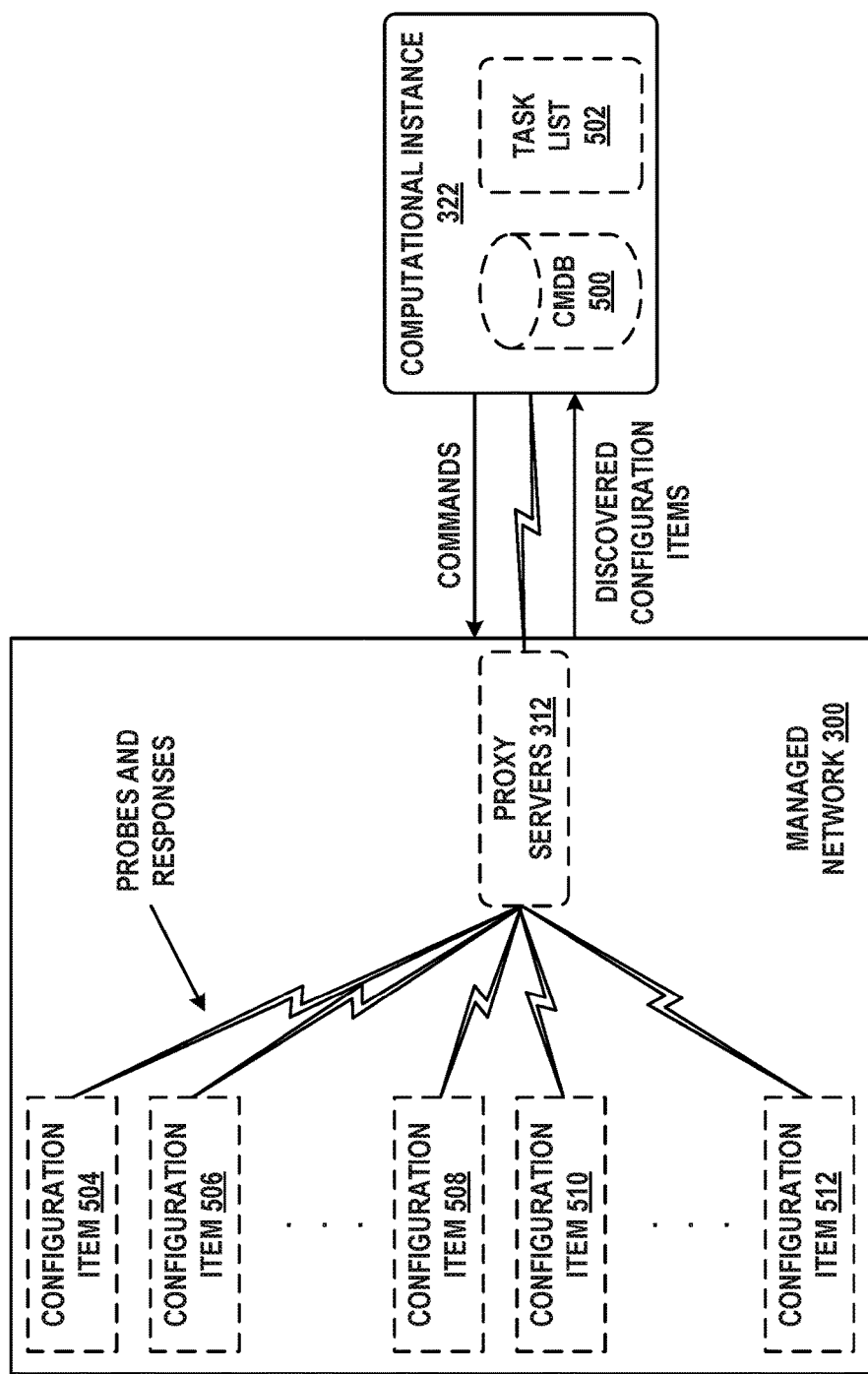
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
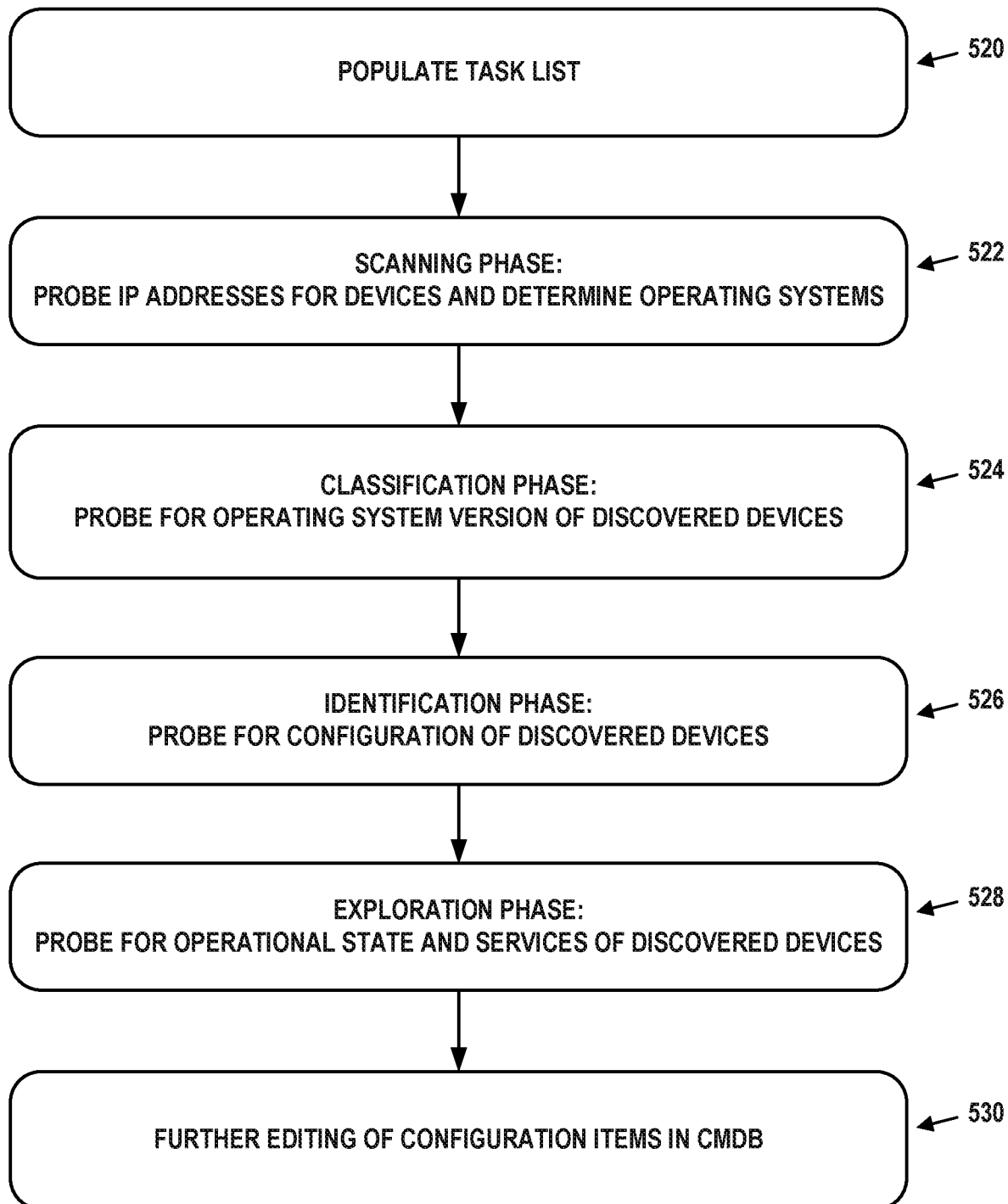
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Reconciliation of Entitlements to Virtualized Applications

Managed network 300 can include one or more virtual applications that allow access to one or more corresponding actual applications, where an actual application can store executable instructions for computer software, and where a virtual application can refer to an actual application to provide access to the actual application. Virtual applications can be grouped onto virtual desktops, so that a virtual desktop could allow access to multiple virtual applications.

Software licenses regarding some applications, including some virtual applications, can be based on a count of entities that have access to these applications, where an entity included in the count of entities can be a user, a device, a computer processor, a computer processor core, and/or one or more other entities. Such software licenses that are based on a count of entities may consider access to a virtual desktop to provide access to each virtual application of the virtual desktop. The herein-described techniques and embodiments relate to determining compliance to software licenses that are based on counts of entities that have access to software applications, including access to software applications via virtual applications and/or virtual desktops. The herein-described techniques and embodiments may be performed by one or more computing devices and/or one or more computing systems, such as a computing system within a computational instance of a remote network management platform, where the computational instance is dedicated to the managed network.

Figure 6:
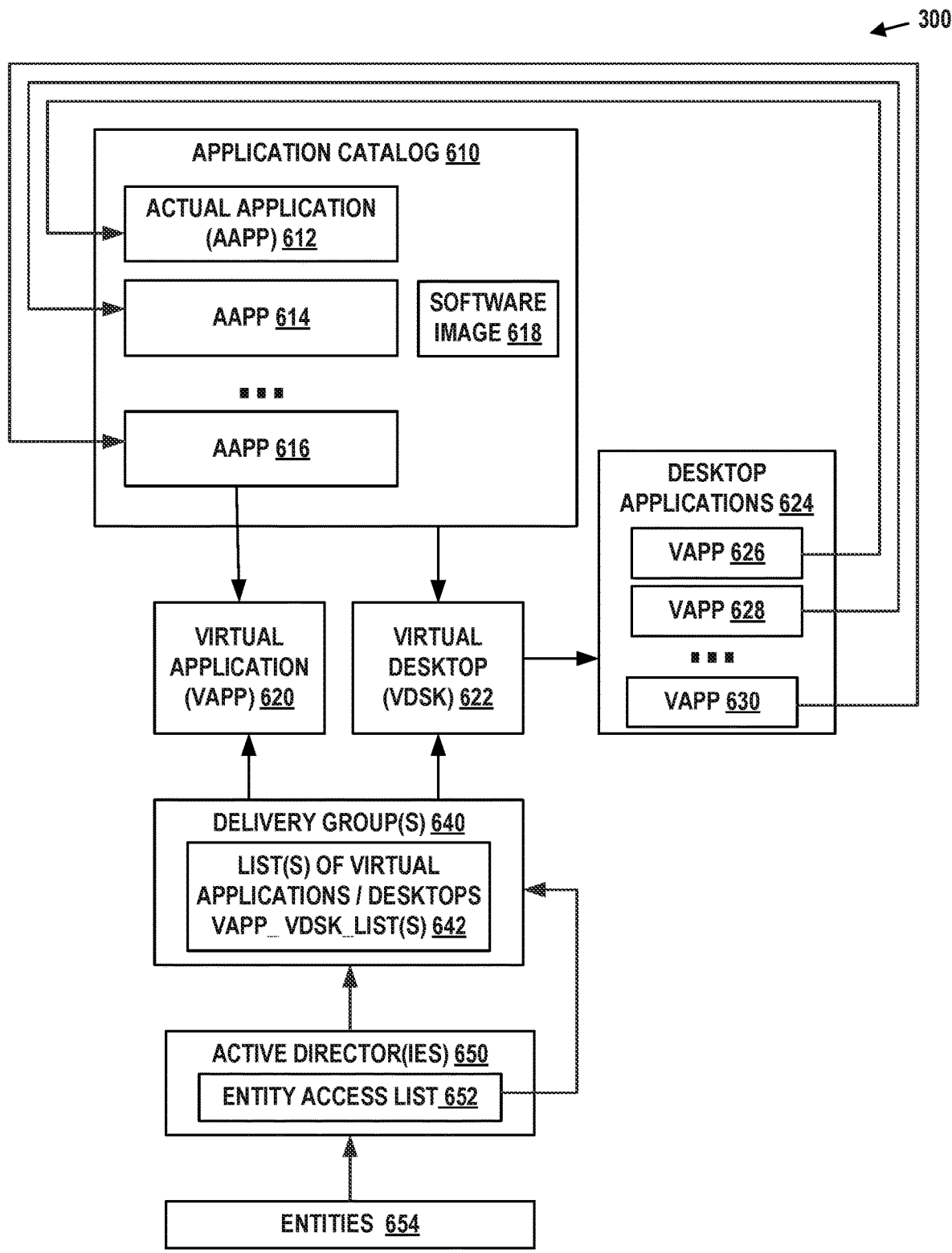
FIG. 6 illustrates an architecture of virtual applications within managed network 300, in accordance with example embodiments.

FIG. 6 illustrates an architecture of virtual applications within managed network 300, in accordance with example embodiments. FIG. 6 illustrates that managed network 300 can include application catalog 610 storing software applications, such as but not limited to, actual applications (AAPPs) 612, 614, and 616, virtual applications (VAPPs)

620, virtual desktop 622, delivery groups 640, and active directories 650, which are accessible by various entities 654, where entities 654 can include, but not are limited to, one or more users, devices, computer processors, and/or computer processor cores.

Application catalog 610 can store and/or refer to executable instructions for computer software. An actual application, such as each of actual applications 612, 614, 616, can store executable instructions for a software application. In some examples, the actual application can be part of a software image storing executable instructions for one or more software applications. For example, software image 618 can store executable instructions for one or more software applications, such as, but not limited to, actual applications 612, 614, 616. In some examples, software images, such as software image 618, are not stored in application catalog 610.

A virtual application, such as virtual application 620, can include a reference to an actual application, such as an actual application in application catalog 610. For example, FIG. 6 shows that virtual application 620 refers to actual application 616. In this example, a request to execute virtual application 620 can involve loading part or all of a copy of actual application 616 into transient storage (e.g., random access memory) and executing the copy of actual application 616 from transient storage. Then, from a user's point of view, virtual application 620 acts the same as actual application 616.

A virtual desktop can include one or more references to virtual applications, such as desktop applications 624 of virtual desktop 622, where the virtual applications include virtual applications 626, 628, and 630. In this example, virtual applications 626, 628, and 630 respectively refer to actual applications 612, 614, 616. Therefore, virtual desktop 622 can use virtual applications 626, 628, 630 provide access to and thereby enable execution of three actual applications 612, 614, 616 available in application catalog 610. Many other examples of virtual applications and desktops are possible as well.

An entity, such as one of entities 654, that has access to virtual application 620 also can be considered to have access to actual application 616. However, the entity that has access to virtual application 620 may or may not actually use and/or execute actual application 616 (using virtual application 620). Also, an entity of entities 654, who has access to virtual desktop 622 can be considered to have access to virtual applications 626, 628, and 630 and therefore can be considered to have access to actual applications 612, 614, 616. However, the entity that has access to virtual desktop 622 may or may not actually use and/or execute one or more of actual applications 612, 614, 616 (using virtual desktop 622 and/or virtual applications 626, 628, 630). Therefore, a number of entities with access to a virtual application can differ from usage statistics for the same virtual application.

One or more delivery groups 640 can include one or more lists of virtual applications and/or virtual desktops VAPP_VDSK_LIST(S) 642 with an associated list of entities. This list may include one or more of entities 654, who have access to the virtual applications and/or virtual desktops, thereby enabling controllable access to virtual applications and/or virtual desktops. The list of entities can be included with a delivery group, or can be obtained via reference to an active directory or another data object.

One or more active directories 650 can authenticate and authorize entities, such as one or more of entities 654, to use part or all of managed network 300 by assigning and enforcing security policies, providing domain name and directory services, installing or updating software, and/or allowing controlled access to data objects. In particular, active director(ies) 650 can include an entity access list 652 indicating which entities, such as one or more of entities 654, who have access to delivery group(s) 640, and thereby have access to list VAPP_VDSK list 642.

Figures 7A, 7B:
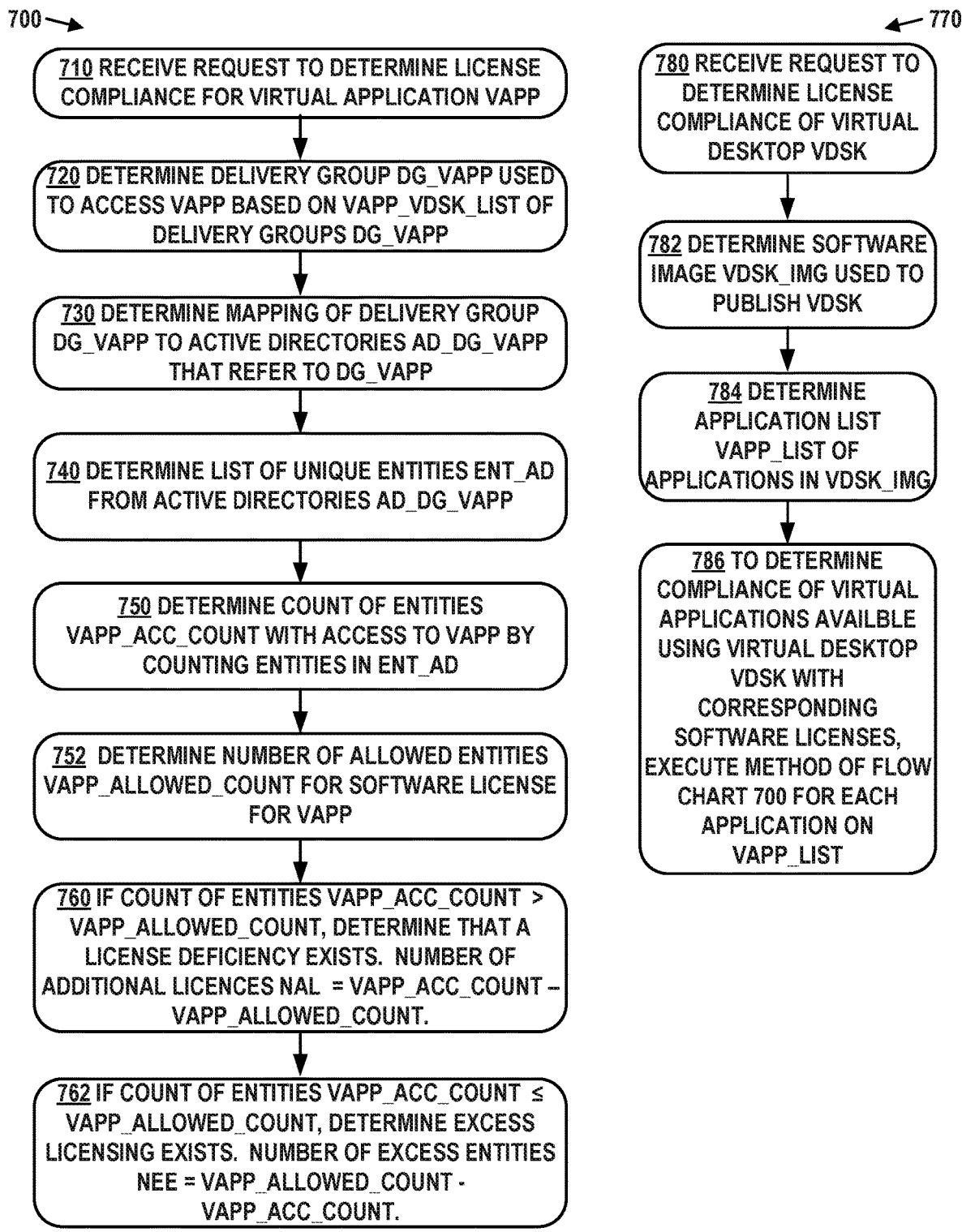
FIG. 7A is a flow chart, in accordance with example embodiments.
FIG. 7B is a flow chart, in accordance with example embodiments.

FIG. 7A is a flow chart 700, in accordance with example embodiments. Flow chart 700 illustrates a method for determining a count of entities that have access to a particular virtual application, and determining whether managed network 300 is in compliance with a software license associated with the particular virtual application based on the count of entities. The method illustrated by flow chart 700 may be carried out by a computing device, such as computing device 100, and/or a cluster of computing devices, such as server cluster 200. However, the method can be carried out by other types of devices or device subsystems. For example, the method could be carried out by a portable computer, such as a laptop or a tablet device. The embodiments of FIG. 7A may be simplified by the removal of any one or more of the features shown therein. Further, these embodiments may be combined with features, aspects, and/or implementations of any of the previous figures or otherwise described herein.

The method illustrated by flow chart 700 can begin at block 710. Block 710 involves receiving a request to determine license compliance for a virtual application VAPP.

Block 720 involves determining a delivery group DG_VAPP used to access virtual application VAPP. The delivery group DG_VAPP can be based on searching one or more lists of virtual applications and/or virtual desktops of delivery group(s) 640. For example, suppose that VAPP is found in a list of virtual applications and/or virtual desktops VAPP_VDSK_LIST1 while searching lists of virtual applications and/or virtual desktops of delivery group(s) 640. Then, DG_VAPP can be the delivery group whose list of virtual applications and/or virtual desktops is VAPP_VDSK_LIST1. In some examples, a delivery group DG_VAPP used to access virtual application VAPP is not found at block 720. In these examples, the method illustrated by flow chart 700 can end, perhaps after indicating an error condition that VAPP was not found.

Block 730 involves determining a mapping of delivery group DG_VAPP to one or more active director(ies) AD_DG_VAPP that refer to delivery group DG_VAPP. For example, one or more queries can be provided to one or more delivery controller devices and/or active directory controller devices associated with delivery group DG_VAPP to determine active director(ies) AD_DG_VAPP that refer to delivery group DG_VAPP. In some examples, more than one delivery group DG_VAPP can be found as being used to access virtual application VAPP at block 720. In these examples, the procedures of block 730 can be carried out for each delivery group of DG VAPP to obtain a set of active directory groups that can be used as AD_DG_VAPP.

Block 740 involves determining a list of unique entities ENT_AD from the one or more active director(ies) AD_DG_VAPP that refer to delivery group DG_VAPP. For example, one or more queries can be provided to one or more delivery controller devices and/or active directory controller devices associated with each active directory in AD_DG_VAPP to determine a list of entities that have access to the active directory. Then, the lists of entities determined for all active directories in AD_DG_VAPP can be combined (if necessary) and the list of unique entities ENT_AD can be determined as a list of unique entities in the combined list.

Block 750 involves determining a count of entities of VAPP_ACC_COUNT with access to virtual application VAPP by counting entities in list of unique entities ENT_AD. In some examples, an algorithm that solves the count-distinct problem can be used to determine count of entities VAPP_ACC_COUNT. The count-distinct problem involves finding a number of distinct elements in a data stream, such as the combined lists of entities determined for all active directories in AD_DG_VAPP discussed above in the context of block 740. Then the algorithm that solves the count-distinct problem can operate on the combined lists of entities to determine VAPP_ACC_COUNT as the number of distinct elements in the combined lists of entities.

Block 752 involves determining number of allowed entities VAPP_ALLOWED_COUNT for one or more software licenses for virtual application VAPP. The remainder of the method illustrated by flow chart 700 assumes that number of allowed entities VAPP_ALLOWED_COUNT is based on a number of allowed entities that have access to the virtual application VAPP.

Block 760 involves comparing count of entities of VAPP_ACC_COUNT with access to virtual application VAPP to number of allowed entities VAPP_ALLOWED_COUNT for one or more software licenses for virtual application VAPP. Then, if VAPP_ACC_COUNT is greater than VAPP_ALLOWED_COUNT, a determination can be made that a license deficiency exists. In this context, a deficiency of software licenses of the one or more software licenses for virtual application VAPP can occur when more entities have access to virtual application VAPP than are licensed under the one or more software licenses for virtual application VAPP. Block 760 can also involve determining a number of additional licenses NAL for compliance one or more software licenses for virtual application VAPP as NAL=VAPP_ACC_COUNT−VAPP_ALLOWED_COUNT. In some examples, upon completion of block 760, the method specified by flow chart 700 can end.

Block 762 involves comparing count of entities of VAPP_ACC_COUNT with access to virtual application VAPP to number of allowed entities VAPP_ALLOWED_COUNT for one or more software licenses for virtual application VAPP. Then, if VAPP_ACC_COUNT is less than or equal to VAPP_ALLOWED_COUNT, a determination can be made that no license deficiency exists for virtual application VAPP and that there may be a number of excess entities allowed to access virtual application VAPP. In this context, no license deficiency exists when the same number or more entities are licensed under the one or more software licenses for virtual application VAPP than have access to virtual application VAPP. Block 762 can also involve determining a number of excess entities NEE (i.e., the number of excess entities) under the one or more software licenses for virtual application VAPP as NEE=VAPP_ALLOWED_COUNT−VAPP_ACC_COUNT. Upon completion of block 762, the method specified by flow chart 700 can end.

FIG. 7B is a flow chart 770, in accordance with example embodiments. Flow chart 770 illustrates a method for determining a count of entities that have access to virtual applications of the particular virtual desktop, and determining whether managed network 300 is in compliance with one or more software licenses associated with the virtual applications of the particular virtual desktop. The method illustrated by flow chart 770 may be carried out by a computing device, such as computing device 100, and/or a cluster of computing devices, such as server cluster 200. However, the method can be carried out by other types of devices or device subsystems. For example, the method could be carried out by a portable computer, such as a laptop or a tablet device. The embodiments of FIG. 7B may be simplified by the removal of any one or more of the features shown therein. Further, these embodiments may be combined with features, aspects, and/or implementations of any of the previous figures or otherwise described herein.

The method illustrated by flow chart 770 can begin at block 780. Block 780 involves receiving a request to determine license compliance for a virtual desktop VDSK.

Block 782 involves determining a software image VDSK_IMG used to publish virtual desktop VDSK. For example, software image VDSK_IMG can include executable instructions for each software application available as a virtual application using virtual desktop VDSK; i.e., software image VDSK_IMG stores the actual applications for the virtual applications available using virtual desktop VDSK.

Block 784 involves determining an application list VAPP_LIST of software applications in software image VDSK_IMG.

Block 786 involves determining compliance of virtual applications available using virtual desktop VDSK with corresponding software licenses by carrying out and/or otherwise invoking the method illustrated by flow chart 700 for each application listed in application list VAPP_LIST. Upon completion of block 786, the method specified by flow chart 770 can end.

In related methods, other techniques can be used to determine virtual applications available using virtual desktop VDSK than indicated in the method specified by flow chart 770. For example, one or more queries can be provided to one or more delivery controller devices and/or active directory controller devices to determine application list VAPP_LIST from virtual desktop VDSK rather than from a software image as indicated in the method specified by flow chart 770

In related methods, flow chart 770 can further involve determining a list of unique entities VDSK_ACC_ENT with access to virtual desktop VDSK using the same or similar techniques as used in blocks 720, 730, and 740 of flow chart 700. Then, at block 786, when compliance of virtual applications available using virtual desktop VDSK with corresponding software licenses is determined by carrying out and/or otherwise invoking the method illustrated by flow chart 700, the methods illustrated by flow charts 700 and 770 can be modified to (a) receive the list of unique entities VDSK_ACC_ENT as part of the request to determine license compliance for a virtual application VAPP at block 710, and (b) the method illustrated by flow chart 700 can select only the entities on list of unique entities VDSK_ACC_ENT for inclusion in a list of unique entities ENT_AD at block 740, thereby only counting entities that have access to virtual desktop VDSK when determining compliance of virtual applications available using virtual desktop VDSK with corresponding software licenses.

Figure 8:
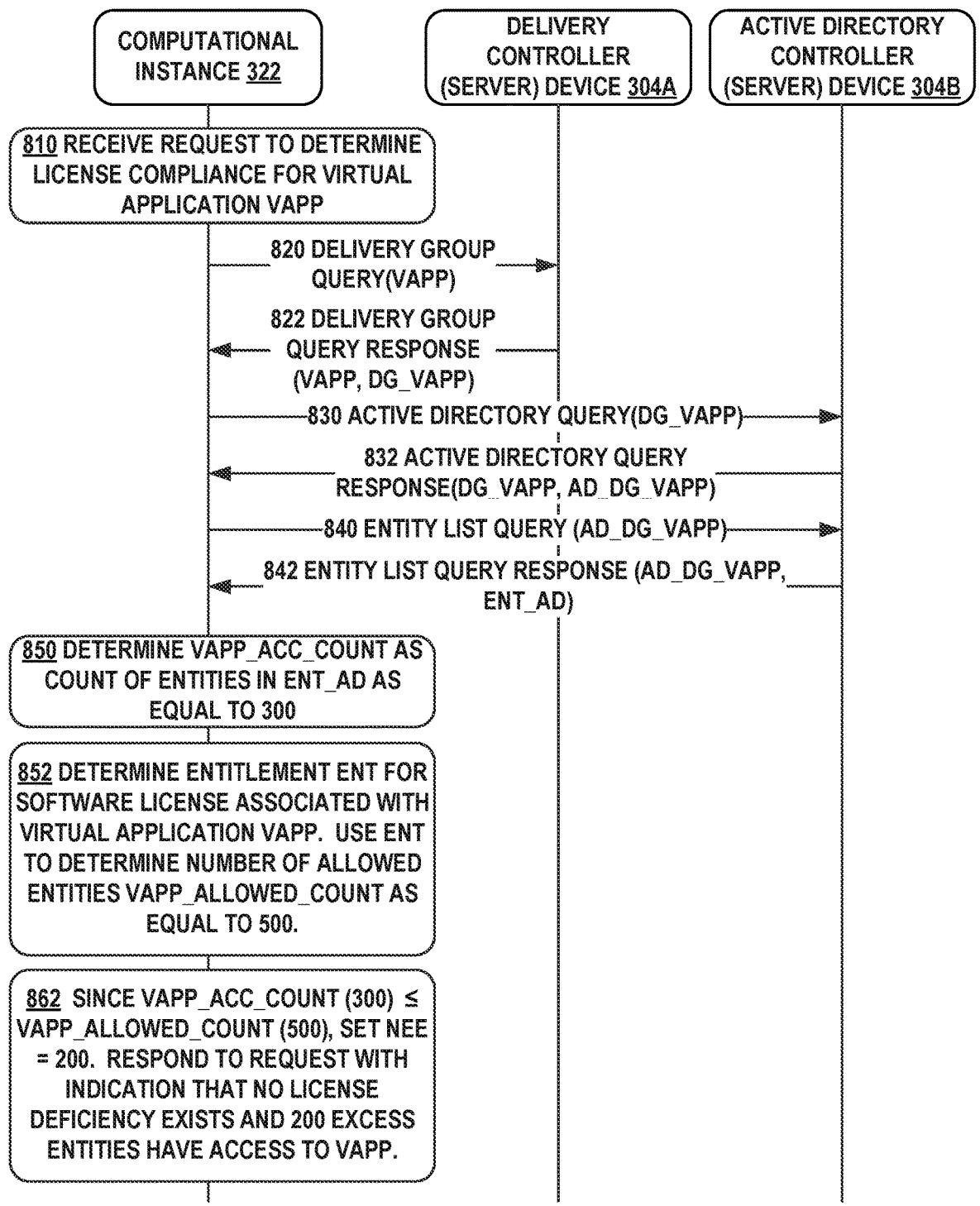
FIG. 8 is a message flow diagram, in accordance with example embodiments.

FIG. 8 is a message flow diagram, in accordance with example embodiments. The message flow diagram of FIG. 8 relates to a scenario 800 where computational instance 322 within remote network management platform 320 executes the method illustrated by flow chart 700 to determine license compliance of a virtual application VAPP.

In scenario 800, both of the delivery group controller device and the active directory controller device mentioned in the context of flow chart 700 can act as server devices. In scenario 800, managed network 300 includes at least two server devices in server devices 304: delivery group controller device 304A and active directory controller device 304B.

The message flow diagram indicates that scenario 800 begins at block 810 of the message flow diagram. At block 810, computational instance 322 performs the procedures of block 710 of flow chart 700 and receives a request to determine license compliance for a virtual application VAPP via a user interface of computational instance 322.

Scenario 800 proceeds with computational instance 322 performing the procedures of block 720 of flow chart 700. In particular, computational instance 322 sends delivery group query 820 to delivery group controller device 304A to determine delivery groups that can be used to access virtual application VAPP. In response to delivery group query 820, delivery group controller device 304A searches for delivery groups that can be used to access virtual application VAPP and sends delivery group query response 822 to computational instance 322 to indicates that delivery group DG_VAPP can be used to access virtual application VAPP.

Scenario 800 proceeds with computational instance 322 performing the procedures of block 730 of flow chart 700. In particular, computational instance 322 sends active directory query 830 to active directory controller device 304B to determine active directories that refer to delivery group DG_VAPP, and so determine a mapping from DG_VAPP to one or more active director(ies). In response to active directory query 830, active directory controller device 304B searches for active directories that refer to delivery group DG_VAPP and sends active directory query response 832 to computational instance 322 to indicate that active directory AD_DG_VAPP refers to delivery group DG_VAPP. Then, computational instance 322 can determine that delivery group DG_VAPP maps to active directory AD_DG_VAPP.

Scenario 800 proceeds with computational instance 322 performing the procedures of block 740 of flow chart 700. In particular, computational instance 322 sends entity list query 840 to active directory controller device 304B to determine a list of entities that have access to active directory AD_DG_VAPP. In response to entity list query 840, active directory controller device 304B determines entities that have access to active directory AD_DG_VAPP and sends entity list query response 842 to computational instance 322 to indicate that list of entities ENT_AD have access to active directory AD_DG_VAPP. In scenario 800, the list of entities ENT_AD received by computational instance 322 is a list of unique entities that have access to active directory AD_DG_VAPP.

Scenario 800 proceeds with computational instance 322 performing the procedures of block 750 of flow chart 700. In particular, block 850 of the message flow diagram indicates that computational instance 322 determines a count of entities of VAPP_ACC_COUNT with access to virtual application VAPP by counting entities in list of unique entities ENT_AD. For scenario 800, VAPP_ACC_COUNT equals 300 indicating that 300 entities within managed network 300 can access virtual application VAPP.

Scenario 800 proceeds with computational instance 322 performing the procedures of block 752 of flow chart 700. In particular, block 852 of the message flow diagram indicates that computational instance 322 determines an entitlement ENT that is associated with virtual application VAPP. An entitlement, such as ENT, can represent a software license for a software package. For example, an entitlement can include license metric data specifying metrics and counts associated for the software license. In scenario 800, entitlement ENT includes license metric data that indicates a number of allowed entities VAPP_ALLOWED_COUNT allowed to access software associated with virtual application VAPP is equal to 500. That is, for scenario 800, up to 500 entities within managed network 300 can access the software associated with virtual application VAPP at one time.

Scenario 800 proceeds with computational instance 322 determining that VAPP_ACC_COUNT (whose values is 300) is less than or equal to VAPP_ALLOWED_COUNT (whose value is 500). Then, scenario 800 proceeds with computational instance 322 performing the procedures of block 762 of flow chart 700. In particular, block 862 of the message flow diagram indicates that computational instance 322: determining a number of excess entities NEE (i.e., the number of excess entities in scenario 800) under the one or more software licenses for virtual application VAPP as NEE=VAPP_ALLOWED_COUNT−VAPP_ACC_COUNT=500−300=200, thereby determining that no license deficiency exists for virtual application VAPP. Block 862 of the message flow diagram also indicates that computational instance 322 responds to the request received at block 810 by using its user interface to provide an indication that no license deficiency exists for virtual application VAPP and that number of excess entities for virtual application VAPP equals 200. Upon completion of the procedures of block 862, scenario 800 can end.

Figure 9:
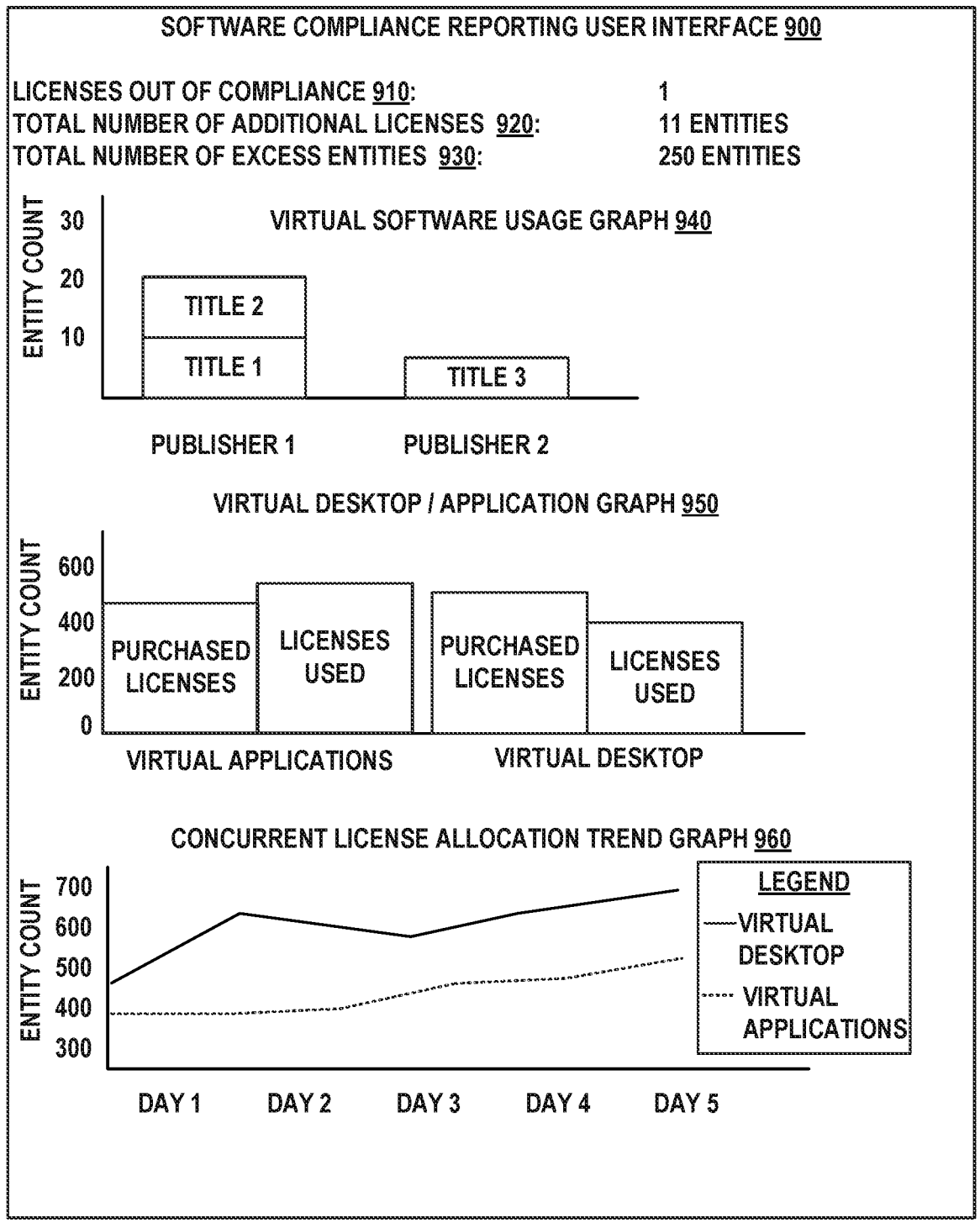
FIG. 9 depicts a user interface for software license compliance reporting, in accordance with example embodiments.

FIGS. 9 and 10 depict user interface 900 for software license compliance reporting, in accordance with example embodiments. FIG. 9 shows that user interface 900 includes number of software licenses out of compliance 910 indicating that "1" software license is out of compliance for a managed network, such as managed network 300. User interface 900 also includes a number of additional licenses 920 indicating a number of entities of "11" with access to one or more software applications that exceeds a number of entities allowed access to the one or more software applications under one or more software licenses. The number of additional licenses 920 can relate to the number of additional licenses discussed above in the context of at least block 760. User interface 900 further includes number of excess entities 930 indicating a number of entities of "250" allowed access to one or more software applications under one or more software licenses that exceeds a number of entities that have access to the one or more software applications. The number of additional licenses 920 can relate to the number of excess entities discussed above in the context of at least block 762

FIG. 9 shows that user interface 900 also includes usage graph 940, virtual desktop/application graph 950, and concurrent license usage graph 960. Usage graph 940 can illustrate per-publisher and per-title usage counts for virtual software (that is, virtual applications and virtual desktops). Usage graph 940 can indicate usage of virtual applications, termed "TITLES" in usage graph 940, provided by two publishers "PUBLISHER 1" and "PUBLISHER 2". In particular, usage graph 940 indicates that each of the two virtual applications "TITLE 1" and "TITLE 2" provided by "PUBLISHER 1" was used by approximately 10 entities, and so virtual applications provided by "PUBLISHER 1" were used by a total of approximately 20 entities. Usage graph 940 indicates that the one virtual application "TITLE 3" provided by "PUBLISHER 2 was used by approximately 7 entities.

Virtual desktop/application graph 950 can illustrate both license allocation and actual usage data for virtual applications and virtual desktops at one time. In virtual desktop/application graph 950, license allocation data is presented as "PURCHASED LICENSES" and actual usage data is presented as "LICENSES USED". Virtual desktop/application graph 950 can indicate that actual virtual application usage of approximately 500 entities slightly exceeds a number of approximately 450 entities that are licensed to access virtual applications, and that a number of approximately 430 entities that are licensed to access virtual desktops exceeds a number of approximately 370 entities that actually use virtual desktops. Virtual desktop/application graph 950 indicates that about 50 additional licenses may be needed to support virtual applications. Virtual desktop/application graph 950 also indicates that number of entities licensed to use virtual desktops could be reduced by about 60 entities while maintaining virtual desktop license compliance, perhaps reducing licensing costs.

Concurrent license usage graph 960 can illustrate license allocation for virtual applications and virtual desktops over time. Concurrent license usage graph 960 can indicate a number of entities using concurrent licenses for virtual applications and virtual desktops over a five-day period of time from "DAY 1") to "DAY 5"). Concurrent license usage for a virtual application (or a virtual desktop) during a time interval T1 (e.g., one day, one week, one month, three months) can indicate a maximum number of entities that simultaneously use the virtual application (or the virtual desktop) during T1. In concurrent license usage graph 960, a solid line is used to show concurrent license usage for virtual desktops and a dashed line to show concurrent license usage for virtual application usage.

Concurrent license usage graph 960 indicates that concurrent license usage for virtual desktops exceeds concurrent license usage for virtual applications during the five days from DAY 1 to DAY 5. Concurrent license usage graph 960 also indicates that concurrent license usage for virtual desktops was at a minimum of about 450 entities during "DAY 1", and generally increased to a maximum of about 700 entities during "DAY 5". Concurrent license usage graph 960 further indicates that concurrent license usage for virtual applications was at a minimum of about 400 entities during "DAY 1" and generally increased to reach a maximum of about 500 entities during "DAY 5".

FIG. 10 depicts user interface 900 for software license compliance reporting showing virtual licensing costs per publisher 1000. Each publisher illustrated in FIG. 10 is associated a publisher compliance/cost indicator. A publisher compliance/cost indicator includes: a compliance indicator indicating whether a managed network, such as managed network 300, is in compliance with software licenses for that publisher, a true up cost to bring software licenses for that publisher in compliance (e.g., to pay for a number of deficient licenses), an excess license cost for software licenses for that publisher (e.g., costs for a number of excess licenses), and a potential savings amount for that publisher.

FIG. 10 specifies that virtual licensing costs per publisher 1000 includes publisher compliance/cost indicators 1010, 1020, 1030, 1040, 1050, 1060 for respective publishers "PUBLISHER 1", "PUBLISHER 2", "PUBLISHER 3", "PUBLISHER 4", "PUBLISHER 5", and "PUBLISHER 6". As an example, an upper-right portion of publisher compliance/cost indicator 1010 for "PUBLISHER 1" indicates that the managed network is "COMPLIANT" with software licenses for PUBLISHER 1. The remainder of publisher compliance/cost indicator 1010 indicates that the true-up costs for software licenses for PUBLISHER 1 is "$0.00", the excess license cost for software licenses for PUBLISHER 1 is "$1024.35", and the potential savings amount for software licenses for PUBLISHER 1 is "$900.00".

As additional examples, upper-right portions of publisher compliance/cost indicators 1020, 1030, 1040, 1050, 1060 for respective publishers "PUBLISHER 2", "PUBLISHER 3", "PUBLISHER 4", "PUBLISHER 5", "PUBLISHER 6" indicates that the managed network is "COMPLIANT" with software licenses for PUBLISHER 3 and "NON-COMPLIANT" with software licenses for PUBLISHER 2, PUBLISHER 4, PUBLISHER 5, and PUBLISHER 6. The remainders of publisher compliance/cost indicators 1020, 1030, 1040, 1050, 1060 indicate that the respective true-up costs for software licenses for respective publishers PUBLISHER 2, PUBLISHER 3, PUBLISHER 4, PUBLISHER 5, and PUBLISHER 6 are "$3,823.00", "$0.00", "$9,345.55", "$5,000.00" and "$88,000.00"; the respective excess license cost for software licenses for the respective publishers are "$123,024.35", "$4,321.28", "$89,126.98", "$0.00" and "$1,234,555.56"; and the respective potential savings amounts for software licenses for the respective publishers are "$10,123.45", "$0.00", "$26,725.49", "$0.00" and "$749,000.00". Note that various values in FIG. 10 are for purposes of illustrating user interface 900, and may or may not be consistent with one another.

VI. Example Operations

FIG. 11 is a flow chart 1100 illustrating an example embodiment. A process illustrated by flow chart 1100 includes operations that may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1110 may involve identifying a virtual software application that is accessible within a managed network.

Block 1112 may involve determining a delivery group associated with accessing the virtual software application within the managed network wherein the delivery group defines entities with access to software applications.

Block 1114 may involve determining a potential-entity count of entities with access to the virtual software application within the managed network based on the delivery group.

Block 1116 may involve calculating compliance of a software license associated with the virtual software application based on the potential-entity count.

In some examples, determining the virtual software application that is accessible within the managed network comprises: determining a virtual desktop representing a plurality of virtual software applications accessible within the managed network; determining the plurality of virtual software applications based on the virtual desktop; and determining that the virtual software application is of the plurality of virtual software applications.

In some examples, determining the plurality of virtual software applications based on the virtual desktop comprises: determining a software image comprising compiled software for the virtual desktop; performing a discovery process to determine discovered software applications within the software image; and determining the plurality of virtual software applications based on the discovered software applications.

In some examples, determining the delivery group associated with accessing the virtual software application within the managed network comprises: determining an active directory associated with the virtual software application; and determining the delivery group associated with accessing the virtual software application based on the active directory. The active directory may be hosted within the managed network and may specify mappings between one or more delivery groups and one or more devices and/or other entities. Thus, determining the delivery group associated with accessing the virtual software application based on the active directory may involve transmitting a query to a computing device disposed within the managed network and with access to the active directory; and receiving a response containing one or more of the mappings. From these mappings, it can be determined the active directory group(s) to which each device or entity belongs, and therefore, the delivery groups to which these devices or entities belong.

In some examples, determining the potential-entity count of entities with access to the virtual software application within the managed network comprises: determining a list of applications associated with the delivery group, the delivery group comprising a list of devices within the managed network; determining whether the virtual software application is on the list of applications associated with the delivery group; and after determining that the virtual software application is on the list of applications associated with the delivery group, determining the potential-entity count of entities with access to the virtual software application within the managed network by: (i) determining a count of the list of devices within the managed network of the delivery group, and (ii) determining a potential-device count of devices with access to the virtual software application within the managed network based on the count of the list of devices.

In some examples, calculating compliance of the software license associated with the virtual software application based on the potential-entity count comprises: determining a number of allowed devices that are allowed to use the virtual software application under the software license; determining whether the potential-device count of devices is greater than the number of allowed devices; and after determining that the potential-device count of devices is greater than the number of allowed devices, determining that the managed network is not compliant with the software license associated with the virtual software application.

In some examples, calculating compliance of the software license associated with the virtual software application based on the potential-entity count comprises: determining a number of allowed devices that are allowed to use the virtual software application under the software license; determining whether the potential-device count of devices is greater than the number of allowed devices; and after determining that the potential-device count of devices is not greater than the number of allowed devices, determining that the managed network is compliant with the software license associated with the virtual software application.

In some examples, determining the potential-entity count of entities with access to the virtual software application within the managed network comprises: determining a list of applications associated with the delivery group, the delivery group comprising a list of users within the managed network; determining whether the virtual software application is on the list of applications associated with the delivery group; and after determining that the virtual software application is on the list of applications associated with the delivery group, determining the potential-entity count of entities with access to the virtual software application within the managed network by: (i) determining a count of the list of users within the managed network of the delivery group, and (ii) determining a potential-user count of users with access to the virtual software application within the managed network based on the count of the list of users.

In some examples, calculating compliance of the software license associated with the virtual software application based on the potential-entity count comprises: determining a number of allowed users that are permitted to use the virtual software application under the software license; determining whether the potential-user count of users is greater than the number of allowed users; and after determining that the potential-user count of users is greater than the number of allowed users, determining that the managed network is not compliant with the software license associated with the virtual software application.

In some examples, calculating compliance of the software license associated with the virtual software application based on the potential-entity count comprises: determining a number of allowed users that are allowed to use the virtual software application under the software license; determining whether the potential-user count of users is greater than the number of allowed users; and after determining that the potential-user count of users is not greater than the number of allowed users, determining that the managed network is compliant with the software license associated with the virtual software application.

In some examples, the operations of the process illustrated by flow chart 1100 include: determining a number of allowed users that are allowed to use the virtual software application under the software license; determining an actual number of users that used the virtual software application; determining whether the actual number of users is greater than the number of allowed users; and after determining that the actual number of users is not greater than the number of allowed users, determining that the managed network is compliant with the software license associated with the virtual software application.

In some examples, the potential-entity count is based on a potential-user count of users with access to the virtual software application, and wherein the one or more processors are further configured to: generate an output based on the potential-user count of users and the actual number of users.

In some examples, determining the delivery group associated with accessing the virtual software application within the managed network comprises transmitting a query to a computing device disposed within the managed network, wherein the computing device has access to the delivery group; and receiving a response from the computing device, wherein the response includes a representation of the delivery group.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system, comprising:
   one or more processors; and
   a non-transitory computer-readable medium, having stored thereon program instructions that, upon execution by the one or more processors, cause the computing system to perform operations comprising:
   identifying a virtual software application that is accessible within a managed network;
   accessing an active directory associated with the virtual software application;
   determining a delivery group associated with accessing the virtual software application based on the active directory, wherein the delivery group identifies entities with access to one or more software applications, including the virtual software application;
   determining a list of the one or more software applications associated with the delivery group;
   determining whether the virtual software application is on the list of the one or more software applications associated with the delivery group;
   in response to determining that the virtual software application is on the list of the one or more software applications associated with the delivery group, calculating an entity count of the entities with access to the virtual software application within the managed network by: (i) calculating a first count of devices within the managed network of the delivery group, and (ii) calculating a second count of devices with access to the virtual software application within the managed network based on the first count of devices; and
   determining compliance of a software license associated with the virtual software application based on the entity count.

2. The computing system of claim 1, wherein identifying the virtual software application that is accessible within the managed network comprises:
   identifying a virtual desktop representing a plurality of virtual software applications accessible within the managed network;
   determining the plurality of virtual software applications based on the virtual desktop; and
   determining that the virtual software application is of the plurality of virtual software applications.

3. The computing system of claim 2, wherein determining the plurality of virtual software applications based on the virtual desktop comprises:
   identifying a software image comprising compiled software for the virtual desktop;
   performing a discovery process to determine discovered software applications within the software image; and
   determining the plurality of virtual software applications based on the discovered software applications.

4. The computing system of claim 1, wherein determining compliance of the software license associated with the virtual software application based on the entity count comprises:
   determining a number of allowed devices that are allowed to use the virtual software application under the software license;
   determining whether the second count of devices is greater than the number of allowed devices; and in response to determining that the second count of devices is greater than the number of allowed devices, determining that the managed network is not compliant with the software license associated with the virtual software application.

5. The computing system of claim 4, wherein the operations comprise, in response to determining that the managed network is not compliant with the software license associated with the virtual software application, determining a number of additional software licenses to meet a threshold number of software licenses to achieve compliance with the software license associated with the virtual software application.

6. The computing system of claim 1, wherein determining compliance of the software license associated with the virtual software application based on the entity count comprises:
 determining a number of allowed devices that are allowed to use the virtual software application under the software license;
 determining whether the second count of devices is greater than the number of allowed devices; and
 in response to determining that the second count of devices is not greater than the number of allowed devices, determining that the managed network is compliant with the software license associated with the virtual software application.

7. The computing system of claim 1, wherein calculating the entity count of the entities with access to the virtual software application within the managed network comprises:
 determining based on the delivery group a list of users within the managed network;
 and
 in response to determining the list of users, calculating an additional entity count of entities with access to the virtual software application within the managed network by: (i) calculating a third count of the list of users within the managed network of the delivery group, and (ii) calculating a user count of users with access to the virtual software application within the managed network based on the third count of the list of users.

8. The computing system of claim 7, wherein determining compliance of the software license associated with the virtual software application based on the entity count comprises:
 determining a number of allowed users that are allowed to use the virtual software application under the software license;
 determining whether the user count of users is greater than the number of allowed users; and
 in response to determining that the user count of users is greater than the number of allowed users, determining that the managed network is not compliant with the software license associated with the virtual software application.

9. The computing system of claim 7, wherein determining compliance of the software license associated with the virtual software application based on the entity count comprises:
 determining a number of allowed users that are allowed to use the virtual software application under the software license;
 determining whether the user count of users is greater than the number of allowed users; and
 in response to determining that the user count of users is not greater than the number of allowed users, determining that the managed network is compliant with the software license associated with the virtual software application.

10. The computing system of claim 1, wherein the operations comprise:
 determining a number of allowed users that are allowed to use the virtual software application under the software license;
 determining an actual number of users that used the virtual software application;
 determining whether the actual number of users is greater than the number of allowed users; and
 in response to determining that the actual number of users is not greater than the number of allowed users, determining that the managed network is compliant with the software license associated with the virtual software application.

11. The computing system of claim 10, wherein the entity count is based on a user count of users with access to the virtual software application, and wherein the one or more processors are further configured to:
 generate an output based on the user count of users and the actual number of users.

12. The computing system of claim 1, wherein the active directory is configured to be used in assigning security policies, providing domain names, installing software, updating software, allowing controlled access to data objects, or any combination thereof to one or more of the entities within the active directory.

13. A computer-implemented method comprising:
 identifying, by a computing device of a remote network management platform, a virtual software application that is accessible within a managed network;
 accessing, by the computing device, an active directory associated with the virtual software application;
 determining, by the computing device, a delivery group associated with accessing the virtual software application based on the active directory, wherein the delivery group identifies entities with access to one or more software applications, including the virtual software application;
 determining, by the computing device, a list of the one or more software applications associated with the delivery group;
 determining, by the computing device, whether the virtual software application is on the list of the one or more software applications associated with the delivery group;
 in response to determining that the virtual software application is on the list of the one or more software applications associated with the delivery group, calculating, by the computing device, an entity count of the entities with access to the virtual software application within the managed network by: (i) calculating a first count of devices within the managed network of the delivery group, and (ii) calculating a second count of devices with access to the virtual software application within the managed network based on the first count of devices; and
 determining by the computing device, compliance of a software license associated with the virtual software application based on the entity count.

14. The computer-implemented method of claim 13, wherein determining compliance of the software license associated with the virtual software application based on the entity count comprises:

determining a number of allowed devices that are allowed to use the virtual software application under the software license;
determining whether the second count of devices is greater than the number of allowed devices; and
in response to determining that the second count of devices is greater than the number of allowed devices, determining that the managed network is not compliant with the software license associated with the virtual software application.

15. The computer-implemented method of claim 13, wherein determining compliance of the software license associated with the virtual software application based on entity count comprises:
determining a number of allowed that are allowed to use the virtual software application under the software license;
determining whether the second count of devices is greater than the number of allowed devices; and
in response to determining that the second count of devices is not greater than the number of allowed devices, determining that the managed network is compliant with the software license associated with the virtual software application.

16. The computer-implemented method of claim 13, wherein calculating the entity count of the entities with access to the virtual software application within the managed network comprises:
determining a a list of users within the managed network based on the delivery group; and
in response to determining the list of users calculating an additional entity count of entities with access to the virtual software application within the managed network by: (i) calculating a third count of the list of users within the managed network of the delivery group, and (ii) calculating a user count of users with access to the virtual software application within the managed network based on the third count of the list of users.

17. The computer-implemented method of claim 13, wherein identifying the virtual software application that is accessible within the managed network comprises:
identifying, by the computing device, a virtual desktop representing a plurality of virtual software applications accessible within the managed network;
determining, by the computing device, the plurality of virtual software applications based on the virtual desktop; and
determining, by the computing device, that the virtual software application is of the plurality of virtual software applications.

18. An article of manufacture, comprising a non-transitory computer-readable medium, having stored thereon program instructions that, upon execution by a computing system, cause the computing system to perform operations comprising:
identifying, by a computing device of a remote network management platform, a virtual software application that is accessible within a managed network;
accessing, by the computing device, an active directory associated with the virtual software application;
determining, by the computing device, a delivery group associated with accessing the virtual software application within the managed network based on the active directory, wherein the delivery group identifies entities with access to one or more software applications, including the virtual software application;
determining, by the computing device, a list of the one or more software applications associated with the delivery group;
determining, by the computing device, whether the virtual software application is on the list of the one or more software applications associated with the delivery group;
in response to determining that the virtual software application is on the list of the one or more software applications associated with the delivery group, calculating, by the computing device, entity count of entities with access to the virtual software application within the managed network by: (i) calculating a first count of devices within the managed network of the delivery group, and (ii) calculating a second count of devices with access to the virtual software application within the managed network based on the first count of devices; and
determining by the computing device, compliance of a software license associated with the virtual software application based on the entity count.

19. The article of manufacture of claim 18, wherein calculating the entity count of entities with access to the virtual software application within the managed network comprises:
determining a list of users within the managed network based on the delivery group; and
in response to determining the list of users, calculating an additional entity count of entities with access to the virtual software application within the managed network by: (i) calculating a third count of the list of users within the managed network of the delivery group, and (ii) calculating a user count of users with access to the virtual software application within the managed network based on the third count of the list of users.

20. The article of manufacture of claim 18, wherein identifying the virtual software application that is accessible within the managed network comprises:
identifying, by the computing device, a virtual desktop representing a plurality of virtual software applications accessible within the managed network;
determining, by the computing device, the plurality of virtual software applications based on the virtual desktop; and
determining, by the computing device, that the virtual software application is of the plurality of virtual software applications.

* * * * *

UNITED STATES PATENT AND TRADEMARK OFFICE
CERTIFICATE OF CORRECTION

PATENT NO. : 11,481,474 B2
APPLICATION NO. : 16/669005
DATED : October 25, 2022
INVENTOR(S) : Rohan Tyagi and Prateek Bansal It is certified that error appears in the above-identified patent and that said Letters Patent is hereby corrected as shown below:

In the Claims

Column 31, Claim 15, Line 15 - insert --devices-- between "allowed" and "that".

Signed and Sealed this
Twenty-first Day of February, 2023

Katherine Kelly Vidal
*Director of the United States Patent and Trademark Office*